United States Patent
Pepka et al.

(10) Patent No.: US 6,450,280 B1
(45) Date of Patent: Sep. 17, 2002

(54) SNOWMOBILE SUSPENSION SYSTEM

(75) Inventors: Charles F. Pepka, Bellevue; Michael Warren Thibert, Enumclaw, both of WA (US)

(73) Assignee: Renton Coil Spring Company, Renton, WA (US)

(*) Notice: Subject to any disclaimer, the term of this patent is extended or adjusted under 35 U.S.C. 154(b) by 0 days.

(21) Appl. No.: 09/663,951

(22) Filed: Sep. 19, 2000

(51) Int. Cl.[7] ............................................. B62M 27/02
(52) U.S. Cl. ........................ 180/193; 180/9.5; 180/184
(58) Field of Search ........................ 180/9.1, 9.5, 9.52, 180/184, 185, 190, 193, 182, 9.58; 305/120, 141, 151

(56) References Cited

U.S. PATENT DOCUMENTS

| | | | | |
|---|---|---|---|---|
| 3,527,506 A | * | 9/1970 | Erickson | 180/193 |
| 3,800,897 A | * | 4/1974 | Irvine | 180/193 |
| 3,856,099 A | * | 12/1974 | Bowers | 180/193 |
| 3,913,694 A | * | 10/1975 | Forsgren | 180/193 |
| 3,922,024 A | * | 11/1975 | Burkhardt et al. | 180/193 |
| 4,093,033 A | * | 6/1978 | Rosch | 180/193 |
| 4,133,400 A | * | 1/1979 | Shiraishi | 180/193 |
| 4,222,453 A | * | 9/1980 | Fixsen et al. | 180/193 |
| 4,284,161 A | * | 8/1981 | Blass | 180/184 |
| 4,987,965 A | * | 1/1991 | Bourret | 180/193 |
| 5,791,429 A | * | 8/1998 | Bergman | 180/190 |
| 6,354,391 B1 | * | 3/2002 | Cormican | 180/193 |

OTHER PUBLICATIONS

1. "RCS Cam Blocks", *Snow Tech* magazine, Sep. 2000 issue.
2. Illustration of prior art rear torsion spring suspension system for a snowmobile.

* cited by examiner

Primary Examiner—Brian L. Johnson
Assistant Examiner—Christopher Bottorff
(74) Attorney, Agent, or Firm—Richardson & Folise

(57) ABSTRACT

An improved torsion type rear suspension system for a snowmobile. The suspension includes a pair of rails movable with respect to the snowmobile body and a pair of torsion springs disposed between the body and the rails for biasing the suspension toward its extended position. Also included is a cam block having a contoured cam surface which engages a leg of the torsion spring at a variable point of contact. As the suspension moves from the extended to the collapsed position, the effective length of the spring leg is reduced, resulting in a nonlinear change in spring force as a function of deflection. The cam block may be adjusted with respect to the suspension rails with an eccentric to permit additional adjustment of the spring force function to compensate for varying terrain, vehicle speed, and operator weight.

24 Claims, 4 Drawing Sheets

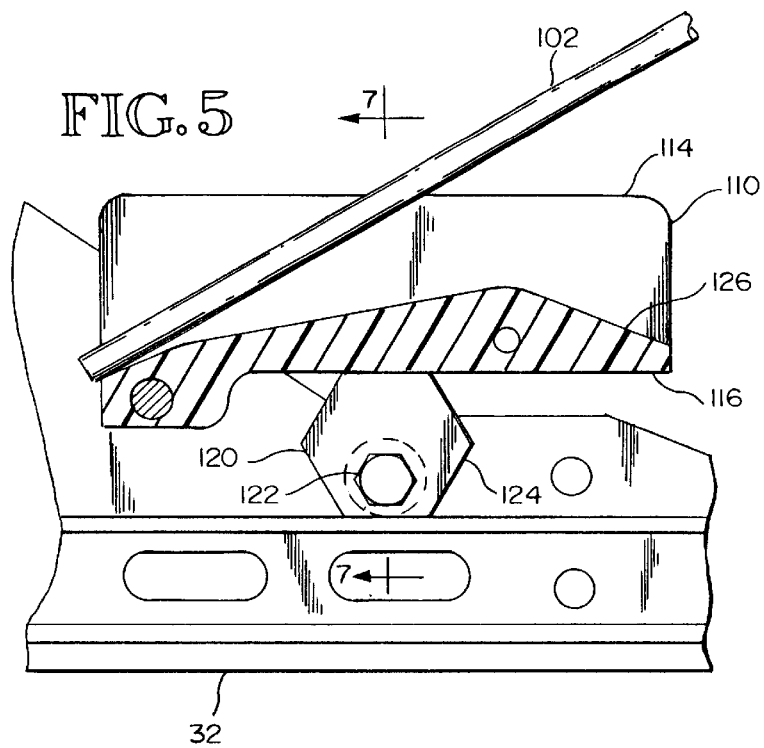
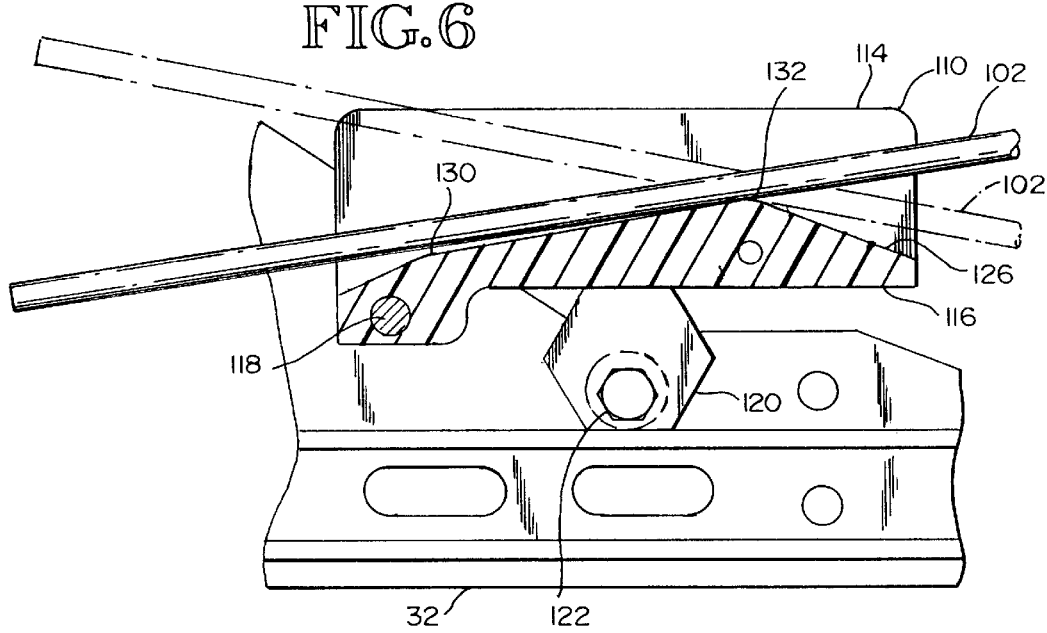

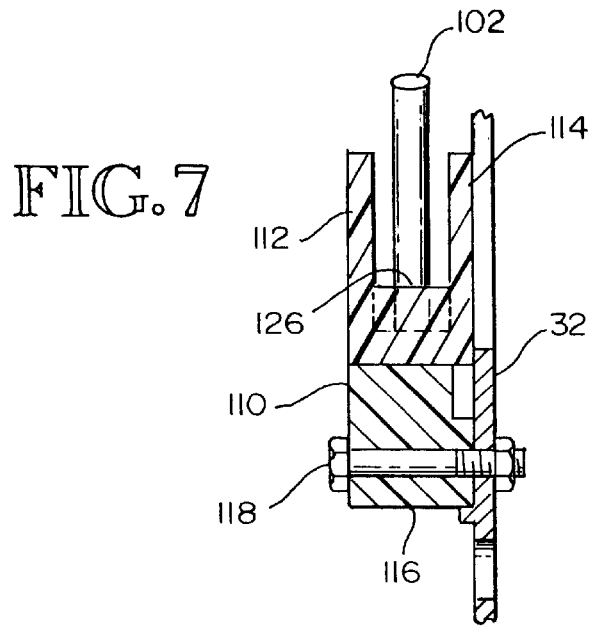
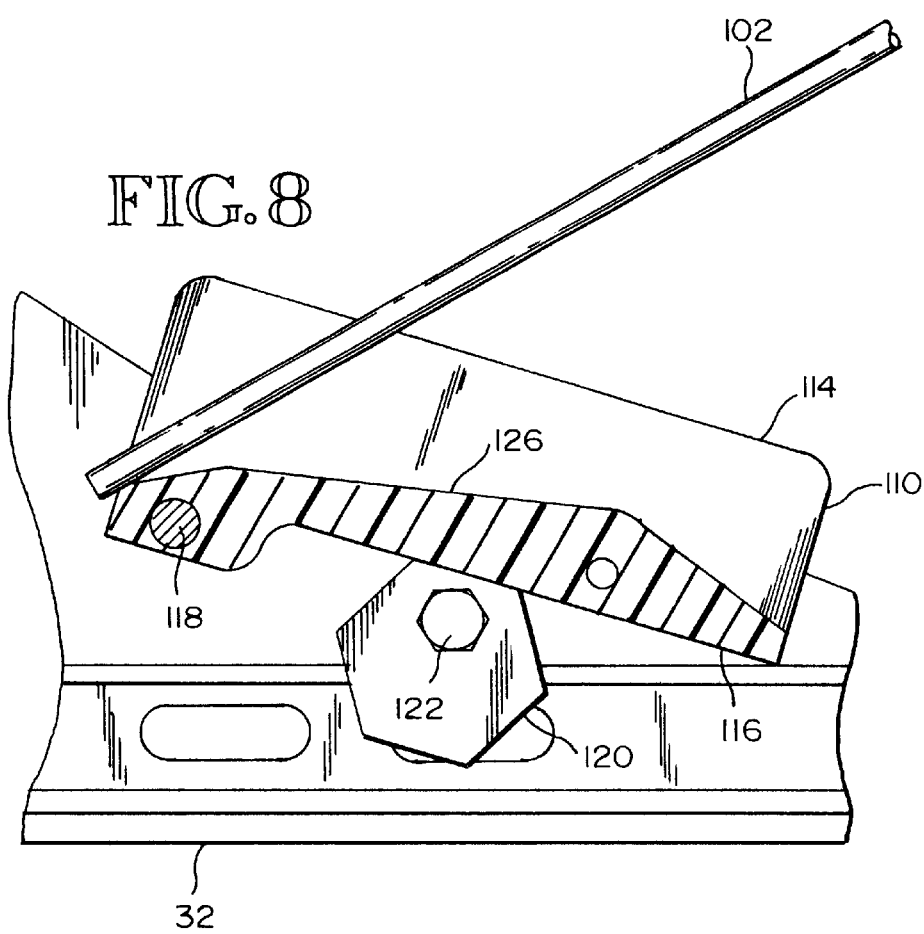

SNOWMOBILE SUSPENSION SYSTEM

TECHNICAL FIELD

This invention generally relates to vehicle suspension systems and more particularly to an improved rear torsion spring suspension system for a snowmobile.

BACKGROUND OF THE INVENTION

The principal function of any vehicle suspension system is to produce riding characteristics acceptable to vehicle occupants throughout the entire speed range of the vehicle and on the various types of terrain over which the vehicle will operate. A snowmobile suspension must be able to accommodate snow surfaces which vary from "hard pack" to powder, terrain which varies from frozen lake surfaces to unimproved backwoods trails, and speed ranges which well exceed 100 mph. The vehicles normally have a suspension associated with each of two forward skis and a rear suspension disposed between the drive track and the body. This disclosure focuses on the rear suspension system.

As with most suspension systems, the heart of a snowmobile rear suspension is a tuned combined of springs and shock absorbers. One of the problems that engineers in the field must deal with in designing such suspensions is the relatively limited vertical distance available for suspension travel. That factor, coupled with the geometry of the track drive system, has made the torsion spring, as opposed to the coil or leaf spring, a popular choice as the primary weight bearing spring. Ideally the springs and their associated shock absorbers should be configured to provide a relatively soft ride when the snowmobile is traveling over a series of relatively small, closely spaced bumps but capable of preventing the suspension from being fully collapsed, or "bottoming out", when the vehicle is traveling over large bumps at higher speeds. Ordinarily such performance would require the use of springs having significantly non-linear spring constants. Particularly, the spring constant should remain fixed during the low and intermediate portions of the suspension travel but then should rise rapidly as the suspension approaches maximum deflection. While torsion springs are advantageous in many respects, they tend to have relatively fixed spring constants over the normal operating range.

Accordingly, it is a principal object of this invention to provide for a torsion spring type rear suspension for a snowmobile in which the spring force increases in a non-linear manner as the suspension moves from the extended to collapsed position.

It is a further object of this invention to provide for such a suspension in which the spring rate characteristics are adjustable to accommodate various types of terrain, speed ranges, and operator weight.

It is yet another object of this invention to provide for a novel cam block which, together with other suspension components, will accomplish the above desired objectives and which can be easily retrofitted on existing torsion spring type suspensions.

SUMMARY OF THE INVENTION

This invention can be broadly summarized as providing for an improved suspension for a snowmobile of the type utilizing one or more torsion springs as the principal load carrying spring members. The suspension includes a suspension member movable with respect to the body and a torsion spring for biasing the suspension toward its extended position. The spring includes a coil portion and a leg extending from the coil portion. Also included is means for engaging the spring leg at a variable point of contact. As the suspension moves from the extended position toward the collapsed position, that point of contact is displaced with respect to the engaging means and also with respect to the spring leg. Particularly, it is displaced along the spring leg toward the coil portion of the spring as the suspension is collapsed.

According to a more detailed aspect of the invention, the means for engaging includes a cam having a contoured cam surface which is engaged by the spring leg. As the suspension is collapsed, the point of contact of the spring leg moves along the cam and also along the leg toward the coil portion of the spring. The effect of that movement is to reduce the effective length of the leg, thereby producing a non-linear change in spring force as a function of angular rotation of the leg.

According to a yet more detailed aspect of the invention, the suspension includes means for adjusting the cam block with respect to the suspension rails to permit adjustment of the spring force function to compensate for varying terrain, vehicle speed, and operator weight.

BRIEF DESCRIPTION OF THE DRAWINGS

FIG. 5 is a partial sectional view taken at 5—5 of FIG. 3.

FIG. 6 is a partial sectional view also taken at 5—5 of FIG. 3 showing the relationship of the spring leg and cam block when the suspension is partially and fully collapsed.

FIG. 7 is a sectional view of the cam block taken at 7—7 of FIG. 5.

FIG. 8 is a partial side view of the cam block of FIG. 4 adjusted to a different position.

DETAILED DESCRIPTION OF THE PREFERRED EMBODIMENTS

The novel features believed to be characteristic of this invention are set forth in the appended claims. The invention itself, however, may be best understood, and its various objects and advantages best appreciated, by reference to the detailed description below in connection with the accompanying drawings.

Figure 1:
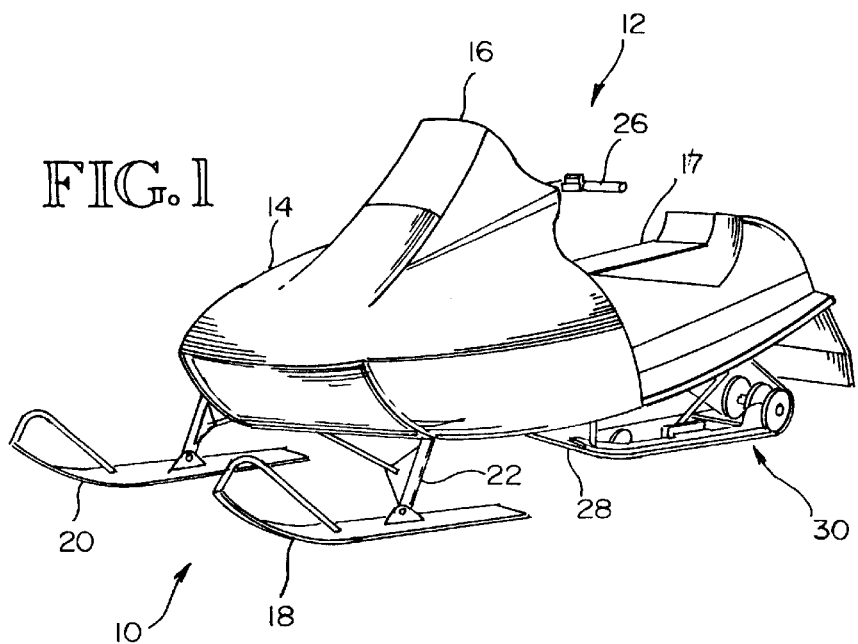
FIG. 1 is a perspective view of a snowmobile including a rear suspension constructed in accordance with the teachings of the present invention.

In FIG. 1 of those drawings a snowmobile including a torsion spring type rear suspension constructed in accordance with teachings of the present invention is illustrated and generally designated by the number 10. The snowmobile body, generally indicated by the number 12, includes a forwardly positioned engine housing 14, windshield 16, and seat 17. The vehicle is supported at its forward end by left and right skis 18 and 20 which are pivotally mounted to left and right spindles 22 and 24, respectively. Those spindles may be rotated in either direction for directional control by the operator through use of handlebars 26. The vehicle is propelled by endless loop track 28 which engages the snow surface and is rotated by an engine-driven drive sprocket (not shown) at its forward end. These features are generally known and commonly found in the construction of many modern snowmobiles.

Figure 2:
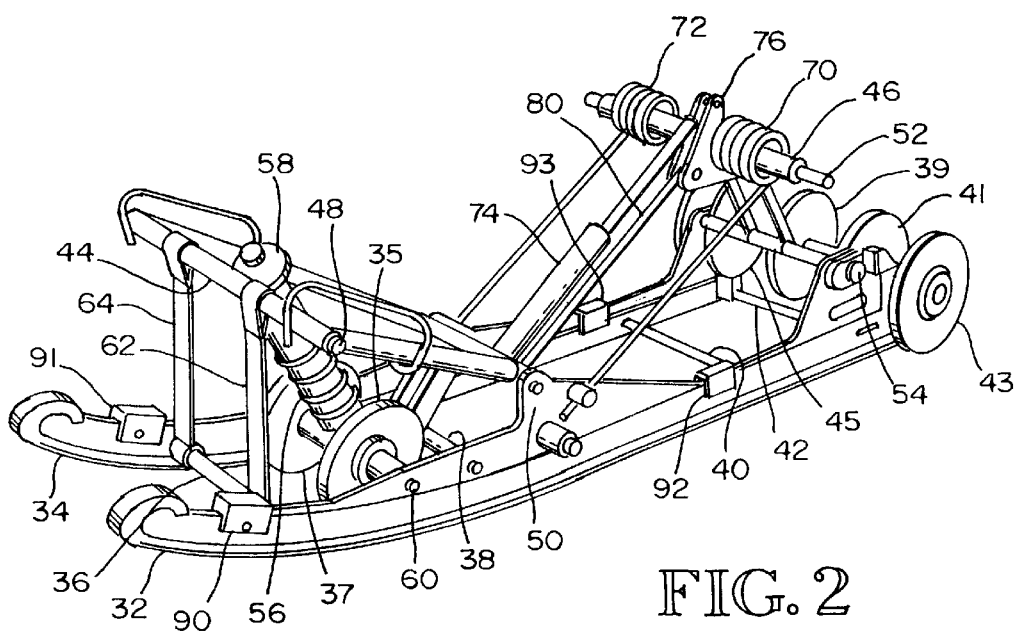
FIG. 2 is a perspective view of the rear suspension of the snowmobile of FIG. 1.

The rear suspension assembly, shown in greater detail in FIGS. 2 through 8 and generally designated by the number 30, is mounted near the aft end of the body for movement between an extended and a collapsed position. The suspension is also partially disposed within a longitudinally oriented tunnel (not shown) formed in the rear underside of the body. Referring to FIG. 2, which illustrates the suspension in the extended position, assembly 30 includes a pair of longitudinally oriented rails, left rail 32 and right rail 34. Those rails, together with idler wheels 35, 37, 39, 41, 43, and 45 guide track 28 beneath the rear suspension. The rails are joined by a plurality of spacer bars, including spacer bars 36, 38, 40, and 42. The rails are joined to the body by front stabilizer arm 44 and rear stabilizer arm 46, each of which is mounted for rotation to the rails and to the body. The front stabilizer arm is mounted to the body for rotation about shaft 48 and to the rails for rotation about shaft 50. Front stabilizer arm 44 is biased toward the extended position by coil spring 56 which surrounds shock absorber 58. That shock absorber is mounted at its upper end to the front stabilizer arm and at its lower end to rails 32 and 34 by means of shaft 60. The extended position of front stabilizer arm 44 is determined by straps 62 and 64 which limit its rotation in the clockwise direction.

Similarly, the rear stabilizer arm is mounted to the body for rotation about shaft 52 and to the rails for rotation about shaft 54. It is biased toward the extended position by torsion springs 70 and 72, each of which surrounds shaft 52. Shock absorber 74 extends between mounting bracket 76 attached to stabilizer arm 46 and mounting bracket 78 which is pivotally mounted to the lower portion of the front stabilizer arm. However, the rotation of mounting bracket 78 is constrained by link 80 which also extends between brackets 76 and 78. The extended position of rear stabilizer arm 46 is limited by bracket 78 and link 80.

As the suspension moves from the extended toward the collapsed position, rails 32 and 34 move upward toward the body and the front and rear stabilizer arms rotate in the counterclockwise direction about their lower pivot point on the rails. Energy imparted to the suspension assembly from the snow surface is dissipated by shock absorbers 58 and 74 as this movement occurs. Rubber stops 90, 91, 92, and 93 are mounted on the rails as shown to cushion the stabilizer arms in the event the suspension assembly is fully collapsed.

Figure 3:
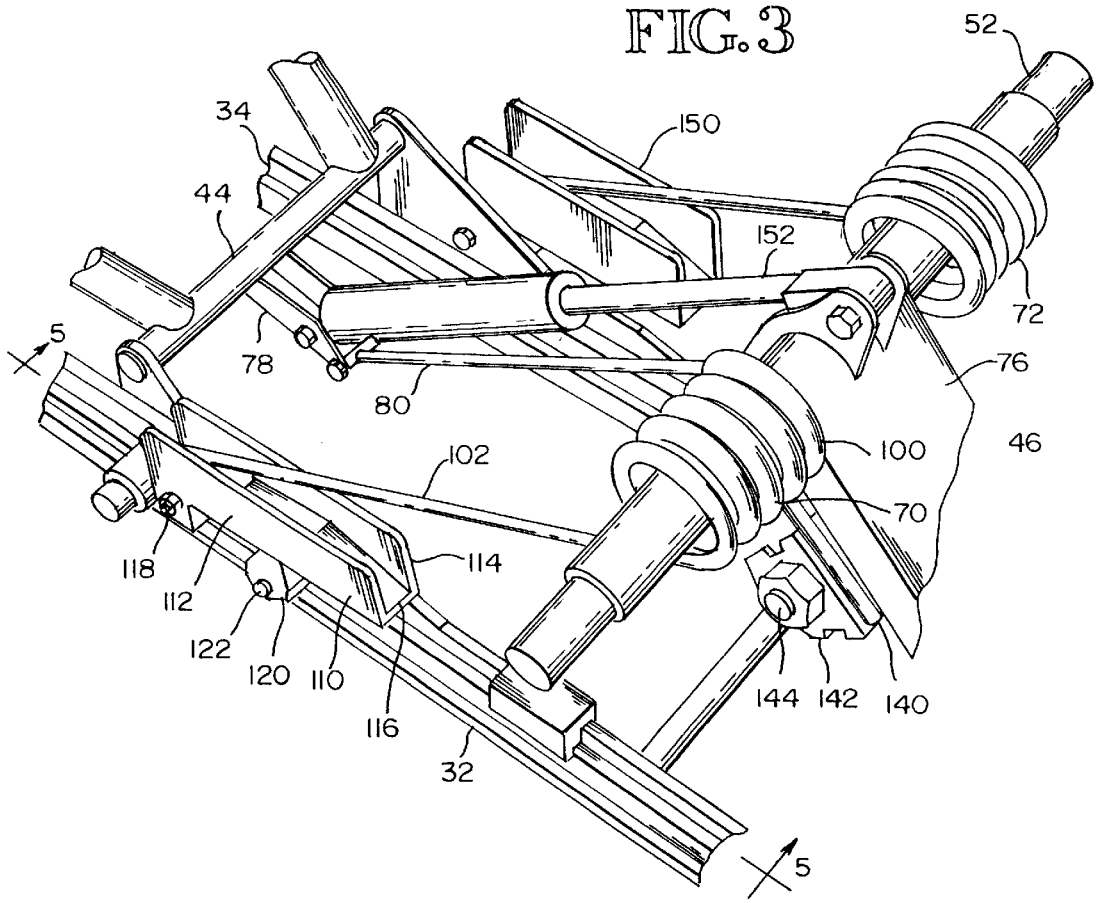
FIG. 3 is a perspective view of a portion of the suspension of FIG. 2 illustrating the suspension in the extended position.

A particularly significant aspect of this invention is the means by which torsion springs 70 and 72 are engaged to rails 32 and 34, respectively. Referring to FIG. 3, it can be seen that spring 72 has a coil portion 100 which encircles shaft 52 and leg 102 which extends generally forward and downward from the outer end of the coil, resting at a point of contact on cam block 110. The cam block, which is shown in greater detail in FIGS. 4 through 8, includes a pair of spaced, parallel-oriented sides 112 and 114 and a lower wall 116 which cooperate to form a channel within which leg 102 rides. The cam block is mounted on rail 32 for rotation about bolt 118. It is also supported by adjustable eccentric 120 which is mounted to rail 32 for rotation about bolt 122. The eccentric, which is shown in greater detail in FIGS. 5 through 8, includes a plurality of flats, such as flat 124, which are spaced at varying radial distances from the axis of bolt 122. As can be seen by comparing FIGS. 5 and 8, the angular orientation of cam block 110 with respect to rail 32 can be varied by selective rotation of the eccentric.

Figure 4:
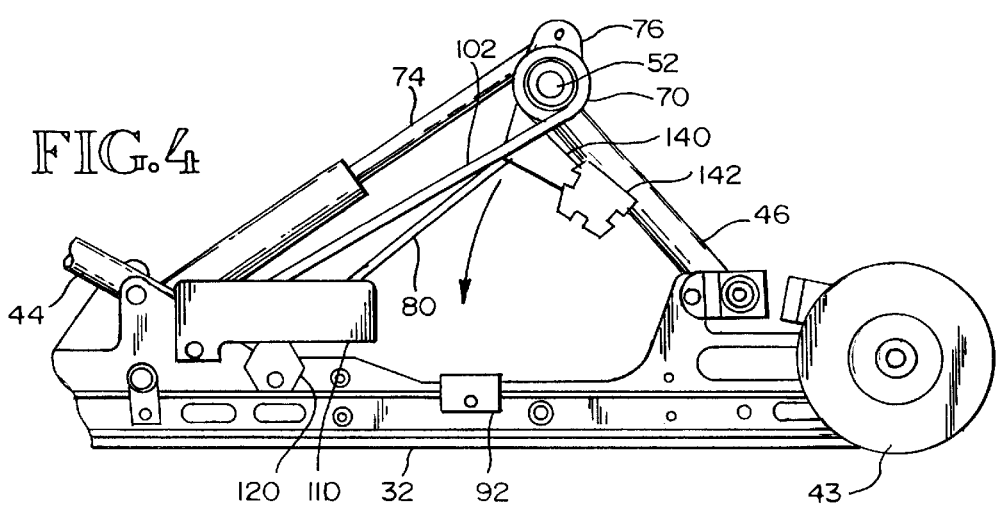
FIG. 4 is a partial side view of the suspension of FIG. 2.

An important aspect of the cam block is upper surface 126 of lower wall 116. As the suspension assembly moves from the extended toward the collapsed position, rear stabilizer arm 46 rotates in a counterclockwise direction (as shown in FIG. 4) causing leg 102 to rotate in a clockwise direction. By comparing FIGS. 5, 6, and 8 it can be seen that as leg 102 rotates clockwise, the point of contact between the leg and surface 126 moves towards the right. At the same time that point of contact also advances to the right along leg 102 toward coil 100. Accordingly, it can be seen that as the suspension is collapsed, the effective length of leg 102 as measured from its point of contact on surface 126 to coil 100 is progressively reduced and the force required per degree of rotation is progressively increased. Thus, as the suspension moves towards the collapsed position, there is apparent increase in the spring constant of torsion spring 70. Moreover, the rate of change of the spring constant depends upon the particular contours of surface 126, which can be varied depending upon the performance characteristics desired.

In the preferred embodiment, it can be seen that when the suspension is lightly loaded and near the extended position (FIG. 5), movement of the suspension causes little change in the spring constant. However, as the suspension is further collapsed, the point of contact between leg 102 and surface 126 moves very rapidly from point 130 to point 132, resulting in a very rapid reduction in the effective length of the leg and a corresponding rapid increase in the apparent spring constant. As the suspension is collapsed even further, the point of contact remains at point 132 and the apparent spring constant remains high but does not further change.

Referring again to FIG. 3, it can be seen that torsion spring 70 includes a second leg 140 which extends generally aft and downward from the inner end of the coil. It rests on top of adjustable eccentric 142, which is mounted on rear stabilizer arm 46 for rotation about bolt 144. As with eccentric 120, it includes a plurality of peripheral surfaces which are located at varying radial distances from the axis of bolt 144. By rotating the eccentric, the angle of leg 140 with respect to the rear stabilizer arm and therefore the preload in spring 70 can be adjusted. Thus, eccentric 142 provides yet another means for adjusting the performance characteristics of the suspension.

Torsion spring 72, which encircles shaft 52 on the right hand side of the rear stabilizer arm, and its associated components including cam block 150, eccentric 152, and eccentric 154 (not shown) are simply mirror images of the respective components found on the left hand side of the suspension assembly and will not be described in detail.

A particularly novel aspect of the present invention is that it provides two different means for altering suspension performance characteristics. First, it provides for a cam block which can be contoured as desired to provide a wide range of spring force to deflection characteristics. Secondly, it provides for a cam block which is pivotally adjustable with respect to the suspension rail and an eccentric for incrementally adjusting the cam block, permitting the variation of spring force to deflection characteristics of a particular cam block.

Thus, it can be seen that the present invention provides for an improved rear torsion spring suspension system for a snowmobile which incorporates many novel features and offers significant advantages over the prior art. Although only one embodiment of this invention has been illustrated and described, it is to be understood that obvious modifications can be made of it without departing from the true scope and spirit of the invention. For example, it would be obvious to modify the design of the cam block yet retain its essential function. It would also be obvious to modify and rearrange the suspension components so that the cam blocks would be mounted to the body rather than to the suspension rails.

We claim:

1. An improved suspension for a snowmobile, the suspension being movable between an extended and a collapsed position and the snowmobile including a body, the suspension comprising:

a suspension member movable with respect to the body;

at least one torsion spring for biasing the suspension toward the extended position, the spring including a coil portion and a leg extending from the coil; and, means for engaging the leg at a variable point of contact, which point translates with respect to the engaging means and with respect to the leg as the suspension moves toward the collapsed position, wherein the means for engaging is pivotally mounted on the movable member.

2. The suspension of claim 1 wherein the member includes at least one rail.

3. The suspension of claim 2 wherein the coil portion of the spring is attached to the body.

4. The suspension of claim 1 wherein the member is mounted for rotation with respect to the body.

5. The suspension of claim 1 wherein the spring is disposed between the body and the rail.

6. The suspension of claim 1 further including a second torsion spring disposed between the body and the movable member.

7. The suspension of claim 1 wherein the means for engaging includes a cam block having a contoured cam surface for engaging the spring leg.

8. The suspension of claim 7 wherein the cam block further includes a pair of spaced sides and a lower wall cooperating to form a channel for retaining the spring leg.

9. The suspension of claim 1 wherein the point of contact translates toward the coil portion with respect to the engaging means and with respect to the leg as the suspension moves toward the collapsed position.

10. The suspension of claim 1 further including means for adjusting the means for engaging.

11. The suspension of claim 10 wherein the means for adjusting includes an eccentric.

12. The suspension of claim 11 wherein the eccentric is mounted for rotation on the suspension member.

13. An improved suspension for a snowmobile, the suspension being movable between an extended and a collapsed position and the snowmobile including a body, the suspension comprising:

at least one rail movable with respect to the body;

at least one torsion spring disposed between the body and the rail for biasing the suspension toward the extended position, the spring including a coil portion and a leg extending from the coil; and, a cam block pivotally mounted on the rail for engaging the leg at a variable point of contact, which point translates with respect to the cam block and with respect to the leg as the suspension moves toward the collapsed position, the cam block including a contoured cam surface for engaging the spring leg.

14. The suspension of claim 13 wherein the rail is mounted for rotation with respect to the body.

15. The suspension of claim 13 wherein the coil portion of the spring is attached to the body.

16. The suspension of claim 13 further including a second torsion spring disposed between the body and the movable members.

17. The suspension of claim 13 wherein the cam block further includes a pair of spaced sides and a lower wall cooperating to form a channel for retaining the spring leg.

18. The suspension of claim 13 wherein the point of contact translates toward the coil portion with respect to the engaging means and with respect to the leg as the suspension moves toward the collapsed position.

19. The suspension of claim 13 further including means for adjusting the cam block with respect to the rail.

20. The suspension of claim 19 wherein the adjusting means includes an eccentric mounted for rotation on the rail.

21. An improved suspension for a snowmobile, the suspension being movable between an extended and a collapsed position and the snowmobile including a body, the suspension comprising:

at least one rail movable with respect to the body;

at least one torsion spring disposed between the body and the rail for biasing the suspension toward the extended position, the spring including a coil portion and a leg extending from the coil;

a cam block pivotally mounted on the rail for engaging the leg at a variable point of contact which point translates toward the coil portion with respect to the cam block and with respect to the leg as the suspension moves toward the collapsed position, the cam block including a pair of spaced sides and a lower wall having a contoured cam surface, the sides and wall cooperating to form a channel for retaining the spring leg; and, an eccentric mounted for rotation on the rail for adjusting the cam block with respect to the rail.

22. A cam block assembly for use with a torsion spring type snowmobile suspension, the suspension including a torsion spring having a coil portion and a leg extending from the coil, comprising:

a pair of spaced sides;

a lower wall disposed between the sides and having a contoured cam surface;

the sides and the lower wall cooperating to form a channel for retaining the spring leg; and means for pivotally mounting the cam block on the suspension.

23. The cam block assembly of claim 22 further including means for adjustably rotating the cam block with respect to the suspension.

24. The suspension of claim 23 wherein the means for rotating includes an eccentric mounted for rotation on the suspension.

* * * * *